United States Patent
Ikeda et al.

(10) Patent No.: US 10,801,379 B2
(45) Date of Patent: Oct. 13, 2020

(54) CONTROLLER AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Yuto Ikeda, Toyota (JP); Yuki Nose, Kasugai (JP); Keiichi Myojo, Okazaki (JP); Hirokazu Ando, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/459,823

(22) Filed: Jul. 2, 2019

(65) Prior Publication Data
US 2020/0049121 A1 Feb. 13, 2020

(30) Foreign Application Priority Data
Aug. 7, 2018 (JP) ................................. 2018-148076

(51) Int. Cl.
*F01N 3/023* (2006.01)
*F02P 5/04* (2006.01)
*F01N 3/035* (2006.01)
*F02D 41/02* (2006.01)
*F01N 13/00* (2010.01)

(52) U.S. Cl.
CPC ............ *F01N 3/023* (2013.01); *F01N 3/035* (2013.01); *F01N 13/009* (2014.06); *F02D 41/024* (2013.01); *F02D 41/029* (2013.01); *F02P 5/045* (2013.01); *F01N 2430/08* (2013.01); *F01N 2900/1602* (2013.01); *F02D 2200/0802* (2013.01)

(58) Field of Classification Search
CPC .. F01N 3/023; F01N 3/035; F01N 2900/1602; F01N 13/009; F01N 2430/08; F02D 41/029; F02D 41/024; F02D 2200/0802
USPC .............................. 123/645, 406.44; 60/274
See application file for complete search history.

(56) References Cited

U.S. PATENT DOCUMENTS

| | | | | |
|---|---|---|---|---|
| 6,041,591 A * | 3/2000 | Kaneko | ................. | F02D 41/024 60/274 |
| 6,293,095 B1 * | 9/2001 | Yamamoto | ............ | F01N 3/0842 60/272 |
| 2005/0268597 A1* | 12/2005 | Kosaka | ................... | F01N 3/023 60/277 |
| 2008/0196391 A1* | 8/2008 | Huang | .................. | F02D 41/008 60/280 |
| 2009/0145115 A1* | 6/2009 | Torisaka | ............... | F01N 3/0253 60/286 |
| 2011/0219750 A1* | 9/2011 | Sakurai | ................... | F01N 3/103 60/285 |

(Continued)

*Primary Examiner* — Mahmoud Gimie
(74) *Attorney, Agent, or Firm* — Oliff PLC

(57) ABSTRACT

A controller executes a fuel introduction process of introducing, in a state in which the crankshaft of an internal combustion engine is rotating, air-fuel mixture that contains fuel injected by a fuel injection valve into the exhaust passage without burning the air-fuel mixture in the cylinder. The controller executes a discharge process of performing spark discharge of an ignition plug at non-combustion ignition timing during the execution of the fuel introduction process. The non-combustion ignition timing is timing within a period in which the air-fuel mixture is not burned in the cylinder even if the spark discharge of the ignition plug is performed.

9 Claims, 3 Drawing Sheets

(56) References Cited

U.S. PATENT DOCUMENTS

2014/0041362 A1    2/2014  Ulrey et al.
2019/0078524 A1*  3/2019  Suchta .................. B60W 20/16

* cited by examiner

CONTROLLER AND CONTROL METHOD FOR INTERNAL COMBUSTION ENGINE

BACKGROUND

1. Field

The present disclosure relates to a controller and a control method for an internal combustion engine.

2. Description of Related Art

US Patent Application Publication No. 2014/41362 discloses a spark-ignition internal combustion engine. This internal combustion engine is equipped with a three-way catalyst and a filter that collects particulate matter. The three-way catalyst is arranged in the exhaust passage. The filter is located in the exhaust passage on the downstream side of the three-way catalyst.

In U.S. Patent Application Publication No. 2014/41362, a fuel introduction process is performed to increase the temperature of the three-way catalyst while the vehicle is coasting, thereby burning and removing particulate matter deposited in the filter. In the fuel introduction process, fuel is injected while the spark discharge of the ignition plug stopped while the vehicle is coasting and the crankshaft is rotating, so that air-fuel mixture is delivered to the exhaust passage without being burned in the cylinder. The unburned air-fuel mixture delivered to the exhaust passage flows into the three-way catalyst and is burned in the three-way catalyst. When the heat generated by the combustion increases the temperature of the three-way catalyst, the temperature of the gas flowing from the three-way catalyst into the filter is increased. When the heat of the high temperature gas increases the temperature of the filter to be higher than or equal to the ignition point of the particulate matter, the particulate matter deposited on the filter is burned and removed.

In US Patent Application Publication No. 2014/41362, during the execution of the fuel introduction process, the spark discharge of the ignition plug is stopped while the fuel is injected. For this reason, the temperature of the electrode of the ignition plug decreases during the execution of the fuel introduction process. Therefore, the fuel injected from the fuel injection valve collects on the electrode of the ignition plug and is easily carbonized. Carbon on the electrode of the ignition plug is difficult to burn off with the heat of the electrode. This may cause smoldering of the ignition plug. If the ignition plug smolders during the execution of the fuel introduction process, air-fuel mixture is not ignited when the combustion of air-fuel mixture in the cylinder is resumed, for example, after the fuel introduction process is ended. This may cause a misfire.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a controller for an internal combustion engine is provided. The internal combustion engine includes a fuel injection valve, a cylinder into which air-fuel mixture containing fuel injected by the fuel injection valve is introduced, an ignition plug that ignites the air-fuel mixture introduced into the cylinder by spark discharge, an exhaust passage through which gas discharged from inside the cylinder flows, and a three-way catalyst provided in the exhaust passage. The controller is configured to execute: a fuel introduction process of introducing, in a state in which a crankshaft of the internal combustion engine is rotating, the air-fuel mixture that contains the fuel injected by the fuel injection valve into the exhaust passage without burning the air-fuel mixture in the cylinder; and a discharge process of performing spark discharge of the ignition plug at non-combustion ignition timing during the execution of the fuel introduction process. The non-combustion ignition timing is timing within a period in which the air-fuel mixture is not burned in the cylinder even if the spark discharge of the ignition plug is performed.

In a second general aspect, a controller for an internal combustion engine is provided. The internal combustion engine includes a fuel injection valve, a cylinder into which air-fuel mixture containing fuel injected by the fuel injection valve is introduced, an ignition plug that ignites the air-fuel mixture introduced into the cylinder by spark discharge, an exhaust passage through which gas discharged from inside the cylinder flows, and a three-way catalyst provided in the exhaust passage. The controller includes circuitry that is configured to execute: a fuel introduction process of introducing, in a state in which a crankshaft of the internal combustion engine is rotating, the air-fuel mixture that contains the fuel injected by the fuel injection valve into the exhaust passage without burning the air-fuel mixture in the cylinder; and a discharge process of performing spark discharge of the ignition plug at non-combustion ignition timing during the execution of the fuel introduction process. The non-combustion ignition timing is timing within a period in which the air-fuel mixture is not burned in the cylinder even if the spark discharge of the ignition plug is performed.

In a third general aspect, a control method for an internal combustion engine is provided. The internal combustion engine includes a fuel injection valve, a cylinder into which air-fuel mixture containing fuel injected by the fuel injection valve is introduced, an ignition plug that ignites the air-fuel mixture introduced into the cylinder by spark discharge, an exhaust passage through which gas discharged from inside the cylinder flows, and a three-way catalyst provided in the exhaust passage. The method includes: executing a fuel introduction process of introducing, in a state in which a crankshaft of the internal combustion engine is rotating, the air-fuel mixture that contains the fuel injected by the fuel injection valve into the exhaust passage without burning the air fuel mixture in the cylinder; and executing a discharge process of performing spark discharge of the ignition plug at non-combustion ignition timing during the execution of the fuel introduction process. The non-combustion ignition timing is timing within a period in which the air-fuel mixture is not burned in the cylinder even if the spark discharge of the ignition plug is performed.

Other features and aspects will be apparent from the following detailed description, the drawings, and the claims.

BRIEF DESCRIPTION OF THE DRAWINGS

Throughout the drawings and the detailed description, the same reference numerals refer to the sane elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

A controller 27 for an internal combustion engine 10 according to one embodiment will now be described with reference to FIGS. 1 to 4.

Figure 1:
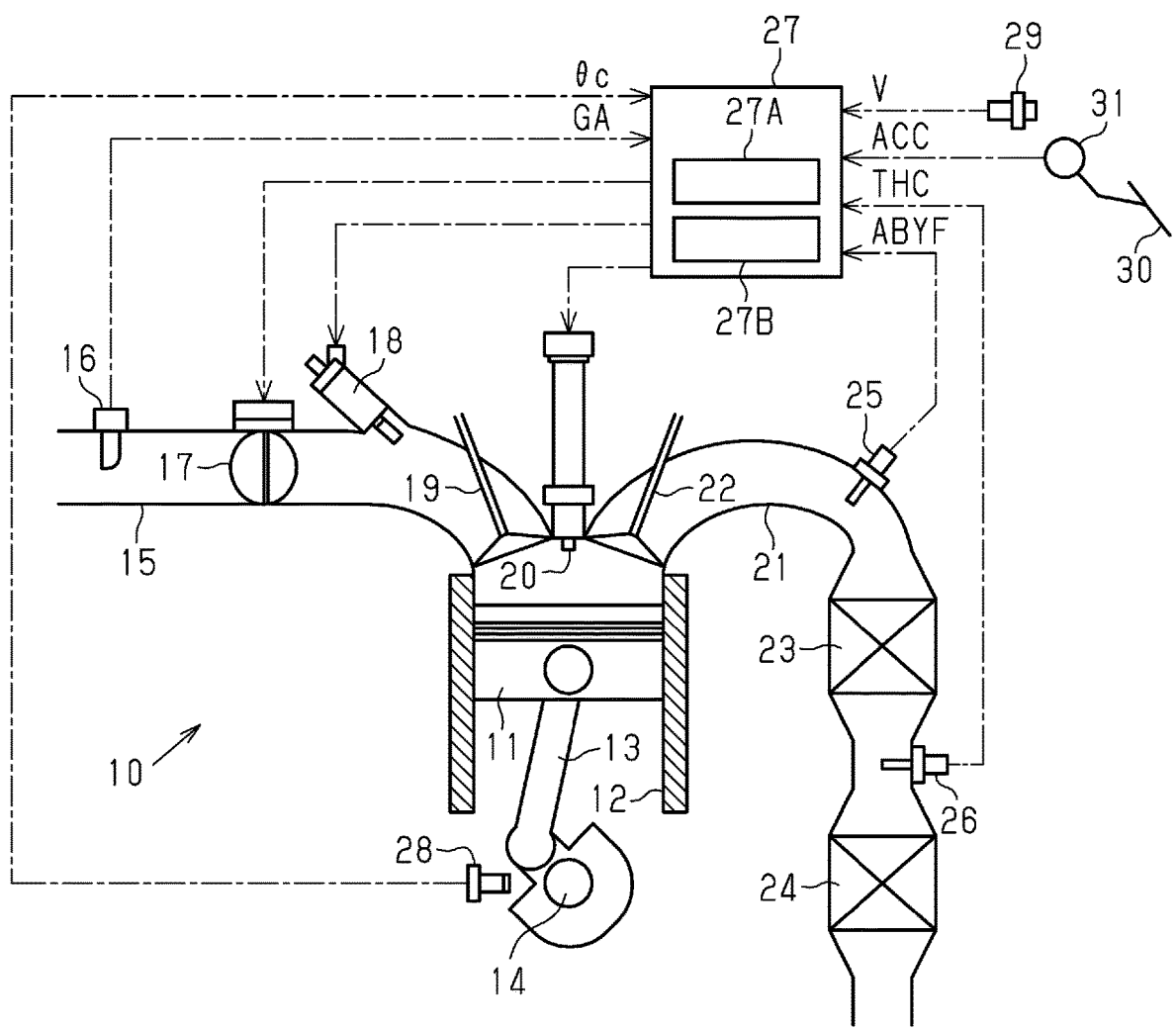
FIG. 1 is a schematic diagram showing a controller for an internal combustion engine according to one embodiment.

The internal combustion engine 10 is mounted on a vehicle and includes a cylinder which accommodates a reciprocating piston 11 as shown in FIG. 1. The piston 11 is coupled to a crankshaft 14 via a connecting rod 13. The reciprocating motion of the piston 11 in the cylinder 12 is converted to rotation of the crankshaft 14.

An intake passage 15, which introduces air to the cylinder 12, is connected to the cylinder 12. The intake passage 15 is provided with an air flowmeter 16, which detects the flow rate of the air flowing through the intake passage 15 (intake air amount GA). A throttle valve 17 is provided in the intake passage 15 on the downstream side of the air flowmeter 16. A fuel injection valve 18 is installed in the intake passage 15 on the downstream side of the throttle valve 17. The fuel injection valve 18 injects fuel into the air flowing through intake passage 15 to form mixture of air and fuel.

The cylinder 12 has as intake valve 19, which opens and closes the intake passage 15 with respect to the cylinder 12. Air-fuel mixture is introduced from the intake passage 15 to the cylinder 12 in response to opening of the intake valve 19. Also, the cylinder 12 is provided with an ignition plug 20, which ignites and burns the air-fuel mixture in the cylinder 12 by spark discharge. The ignition plug 20 has an electrode for spark discharge at the distal end.

The cylinder 12 is connected to an exhaust passage 21, which discharges exhaust gas generated by combustion of air-fuel mixture. The cylinder 12 has an exhaust valve 22, which opens and closes the exhaust passage 21 with respect to the cylinder 12. The exhaust gas is introduced from the cylinder 12 to the exhaust passage 21 in response to opening of the exhaust valve 22. A three-way catalyst 23 is arranged in the exhaust passage 21. The three-way catalyst 23 oxidizes CO and HC in the exhaust gas and simultaneously reduces NOx. Further, a filter 24 for trapping particulate matter in exhaust gas is provided in the exhaust passage 21 on the downstream side of the three-way catalyst 23. Also, an air-fuel ratio sensor 25 is provided in the exhaust passage 21 on the upstream side of the three-way catalyst 23. The air-fuel ratio sensor 25 detects the oxygen concentration of the gas flowing in the exhaust passage 21, that is, the air-fuel ratio of the air-fuel mixture. Also, a catalyst exit gas temperature sensor 26 is provided in the exhaust passage 21 between the three-way catalyst 23 and the filter 24. The catalyst exit gas temperature sensor 26 detects a catalyst exit gas temperature THC, which is the temperature of the gas flowing out of the three-way catalyst 23.

The controller 27 of the internal combustion engine 10 includes a central processing unit (hereinafter, referred to as a CPU) 27A and a memory 27B, which stores programs and data that are used in control. The CPU 27A executes programs stored in the memory 27B to execute various types of engine control.

The controller 27 receives detection signals from the air flowmeter 16, the air-fuel ratio sensor 25, and the catalyst exit gas temperature sensor 26. Also, the controller 27 also receives detection signals from a crank angle sensor 28, which detects a crank angle θc, or the rotational angle of the crankshaft 14. Furthermore, the controller 27 receives detection signals from a vehicle speed sensor 29, which detects a vehicle speed V, and an accelerator position sensor 31, which detects an accelerator operation amount ACC of an accelerator pedal 30.

The controller 27 controls the opening degree of the throttle valve 47, the amount and timing of the fuel injection of the fuel injection valve 18, and the timing of the spark discharge of the ignition plug 20 (ignition timing), thereby controlling the operating state of the internal combustion engine 10 in accordance with the driving situation of the vehicle. The controller 27 also calculates the rotational speed of the internal combustion engine 10 (engine rotational speed NE) from the detection result of the crank angle θc by the crank angle sensor 28.

Furthermore, the controller 27 performs a fuel introduction process to heat the three-way catalyst 23 installed in the exhaust passage 21. In the fuel introduction process, air-fuel mixture containing fuel injected from the fuel injection valve 18 is introduced into the exhaust passage 21 without being burned in the cylinder 12. In order to introduce the air-fuel mixture containing the fuel injected by the fuel injection valve 18 into the exhaust passage 21, it is necessary for the cylinder 12 to perform intake and exhaust. Therefore, the controller 27 performs the fuel introduction process when the crankshaft 14 is rotating and the cylinder 12 is performing intake and exhaust. In the present embodiment, the fuel introduction process is performed to prevent the filter 24 from being clogged.

Figure 2:
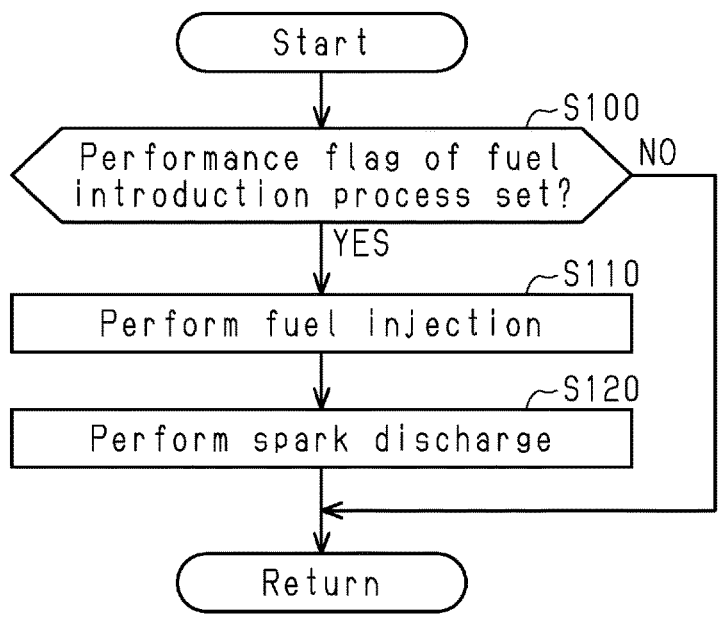
FIG. 2 is a flowchart showing the procedure of a fuel introduction process.

FIG. 2 shows the procedure of the fuel introduction process. The series of processes shown in FIG. 2 is implemented by the CPU 27A repeatedly executing programs stored in the memory 27B at prescribed control intervals while the controller 27 is activated. In the following description, the number of each step is represented by the letter S followed by a numeral.

When this process is started, the CPU 27A first determines whether a performance flag of the fuel introduction process is set (S100). If the performance flag of the fuel introduction process is cleared (S100: NO), the CPU 27A temporarily ends this process. In contrast, if the performance flag is set (S100: YES), the CPU 27A advances the process to S110. When the performance flag of the fuel introduction process is set, the execution condition of the fuel introduction process is satisfied. When the performance flag of the fuel introduction process is cleared, the execution condition of the fuel introduction process is not satisfied. In the present embodiment, if all of the following conditions (A) to (C) are satisfied, the execution condition of the fuel introduction process is satisfied, and the performance flag of the fuel introduction process is set. In contrast, if any of the following conditions (A) to (C) is not satisfied, the execution condition of the fuel introduction process is not satisfied, and the performance flag of the fuel introduction process is cleared.

(A) A fuel cutoff execution flag is set. The fuel cutoff execution flag is a flag indicating that fuel injection of the fuel injection valve 18 and spark discharge of the ignition plug 20 are stopped during coasting of the vehicle, so that the combustion operation of the internal combustion engine 10 is stopped. That is, the fuel cutoff execution flag is a flag indicating that the execution condition of deceleration fuel cutoff is satisfied. Specifically, the CPU 27A sets the fuel cutoff execution flag when the accelerator operation amount ACC is 0, and the vehicle speed V is greater than or equal to a certain value. When the fuel cutoff execution flag is set, the CPU 27A stops the combustion operation of the internal combust ion engine 10. After setting the fuel cutoff execution flag, the CPU 27A clears the fuel cutoff execution flag when the accelerator pedal 30 is depressed to request reacceleration of the vehicle or when the vehicle speed V becomes less than or equal to a prescribed restoration speed. When the fuel cutoff execution flag is cleared, the CPU 27A performs the combustion operation of the internal combustion engine 10.

During coasting of the vehicle, the crankshaft 14 is rotating without the combustion operation of the internal combustion engine 10, which is a state suitable for performance of the fuel introduction process.

(B) Heating of the three-way catalyst 23 is requested. As described above, in the present embodiment, the fuel introduction process is performed to increase the temperature of the three-way catalyst 23 for the purpose of burning and removing particulate matter deposited in the filter 24. The CPU 27A estimates the amount of particulate matter deposited in the filter 24 from the operating state of the internal combustion engine 10, and requests a temperature increase of the three-way catalyst 23 when the estimated amount of particulate matter exceeds a certain value.

(C) Burned gas has been scavenged from the exhaust passage 21. Immediately after combustion in the internal combustion engine 10 is stopped, burned gas remains in the exhaust passage 21. In the present embodiment, the fuel introduction process is started after the burned gas in the exhaust passage 21 is replaced by air. Specifically, based on the fact that the deceleration fuel cutoff has continued for a certain period of time or longer, the CPU 27A determines that the burned gas has been scavenged from the exhaust passage 21.

When advancing the process to S110 as a result of setting the performance flag of the fuel introduction process (S100: YES), the CPU 27A performs fuel injection of the fuel injection valve 18 (S110). At this time, the fuel injection amount of the fuel injection valve 18 is controlled such that the air-fuel ratio of the air-fuel mixture is leaner than the stoichiometric air-fuel ratio.

Also, in accordance with the execution of fuel injection in S110, the CPU 27A executes spark discharge of the ignition plug 20 (S120) and temporarily ends this process.

The ignition timing, which is the timing of spark discharge executed S120, is set to timing at which the air-fuel mixture is neither ignited nor burned in the cylinder 12 even if spark discharge is executed by the ignition plug 20 (hereinafter referred to as non-combustion ignition timing). Specifically, non-combustion ignition timing AOPinj is timing within the following period.

Figure 3:
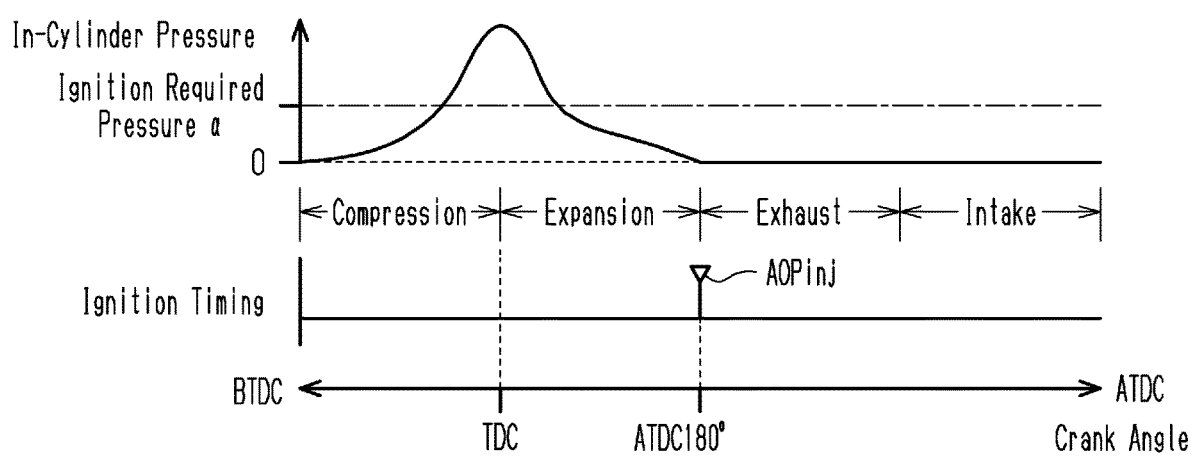
FIG. 3 is a timing diagram showing the ignition timing set during performance of the fuel introduction process.

As shown in FIG. 3, the period in which the spark discharge of the ignition plug 20 can ignite the air-fuel mixture in the cylinder 12 is limited to the period close to the compression top dead center, at which the in-cylinder pressure of the cylinder 12 is higher than or equal to an ignition required pressure $\alpha$, which is the minimum pressure required to ignite the air-fuel mixture. Therefore, if the in-cylinder pressure is lower than the ignition required pressure $\alpha$, the air-fuel mixture is neither ignited nor burned in the cylinder 12 even if spark discharge is executed by the ignition plug 20.

Thus, in the present embodiment, the non-combustion ignition timing AOPinj is set to timing within a period in which the in-cylinder pressure is lower than the ignition required pressure $\alpha$. Specifically, the non-combustion ignition timing AOPinj is set to timing at 180° after the compression top dead center and at which the in-cylinder pressure is lower than the ignition required pressure $\alpha$. In this process, the process of S120 corresponds to a discharge process of performing spark discharge of the ignition plug at the non-combustion ignition timing during the execution of the fuel introduction process.

If the fuel cutoff execution flag is set but the execution flag of the fuel introduction process is cleared, the CPU 27A executes the deceleration fuel cutoff of the internal combustion engine 10. That is, in order to execute the deceleration fuel cutoff, the CPU 27A stops the fuel injection of the fuel injection valve 18 and stops the spark discharge of the ignition plug 20. As described above, when the fuel cutoff execution flag is set, either the deceleration fuel cutoff or the fuel introduction process is performed. Thus, the combustion operation of the internal combustion engine 10 is stopped.

The operation and advantages of the present embodiment will now be described.

Figure 4:
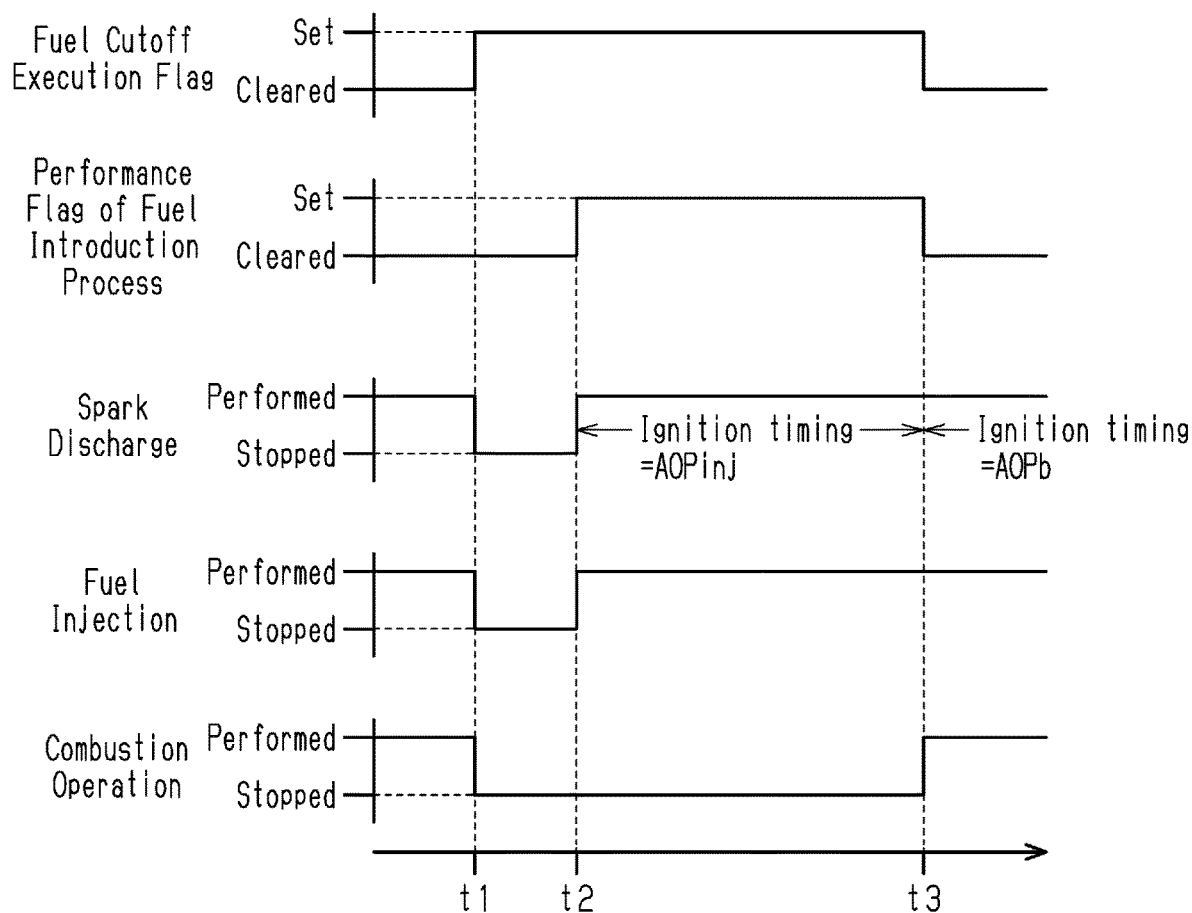
FIG. 4 is a timing diagram showing a manner in which the fuel introduction process is performed.

FIG. 4 shows an example of a manner which the fuel introduction process of the present embodiment is performed. In FIG. 4, the fuel cutoff execution flag is set in the period from a point in time t1 to a point in time t3. During this period, the crankshaft 14 is rotating without the combustion operation of the internal combustion engine 10.

When the fuel cutoff execution flag is set at the point in time t1, the spark discharge of the ignition plug 20 and the fuel injection of the fuel injection valve 18 are stopped, so that the deceleration fuel cutoff of the internal combustion engine 10 is started. Then, at the point in time t2, at which scavenging of the exhaust passage 21 is completed, the performance flag of the fuel introduction process is set.

If the performance flag of the fuel introduction process is set at the point in time t2, the fuel injection of the fuel injection valve 18 is started. At this time, the spark discharge of the ignition plug 20 is also started. The ignition timing at this time is set to the non-combustion ignition timing AOPinj. Therefore, the fuel injected by the fuel injection valve 18 is not burned in the cylinder 12 and is discharged unburned to the exhaust passage 21. That is, the air-fuel mixture introduced to the cylinder 12 is delivered to the exhaust passage 21 without being burned in the cylinder 12. The unburned air-fuel mixture delivered to the exhaust passage 21 flows into the three-way catalyst 23 and is burned in the three-way catalyst 23. The heat generated by the combustion increases the temperature of the three-way catalyst 23 (hereinafter, referred to as catalyst temperature). As the catalyst temperature increases, the temperature of the gas flowing from the three-way catalyst 23 to the filter 24 increases. Then, the temperature of the filter 24 also increases due to the heat of the high temperature gas. When the temperature of the filter 24 increases to become higher than or equal to the ignition point of particulate matter, the particulate matter deposited on the filter 24 is burned and removed.

When the fuel cutoff execution flag is cleared at the point in time t3, the performance flag of the fuel introduction process is cleared at the same time. After the point in time t3, the combustion operation of the internal combustion engine 10 is resumed. When the combustion operation is resumed, the fuel injection amount of the fuel injection valve 18 is controlled to be a suitable amount for the combustion operation. Also, the ignition timing, which has-been set to the non-combustion ignition timing AOPinj, is changed to ignition timing AOPb (for example, timing close to the compression top dead center) at which the air-fuel mixture s burned.

As described above, during the execution of the fuel introduction process, the spark discharge of the ignition plug 20 is performed at the non-combustion ignition timing AOPinj, so that the fuel injected from the fuel injection valve 18 is delivered to the exhaust passage 21 without being burned in the cylinder 12. Also, during the execution of the fuel introduction process, spark discharge is performed to maintain the electrode temperature of the ignition plug 20 high. This allows the carbon collected on the electrode to be burned even during the execution of the fuel introduction process. As a result, the ignition plug 20 is unlikely to smolder during the execution of the fuel introduction process. Therefore, when the combustion of the air-fuel mixture in the cylinder 12 is resumed after the fuel introduction process is ended, the air-fuel mixture will be readily ignited.

The above-described embodiment may be modified as follows. The above-described embodiment and the following modifications can be combined as long as the combined modifications remain technically consistent with each other.

The non-combustion ignition timing AOPinj is set to the timing at 180° after the compression top dead center (exhaust bottom dead center) in the above-described embodiment. However, the non-combustion ignition timing AOPinj may be set to other timing as long as that timing is within the period in which the in-cylinder pressure is lower than the ignition required pressure $\alpha$.

Although the fuel introduction process is performed for the purpose of burning and removing the particulate matter deposited on the filter 24 in the above-described embodiment, the fuel introduction process may be performed to increase the temperature of the three-way catalyst 23 for other purposes. For example, the fuel introduction process may be performed to restore the exhaust purification performance of the three-way catalyst 23 when the exhaust purification performance is reduced due to a decrease in the catalyst temperature.

The fuel introduction process is performed during coasting of the vehicle in the above-described embodiment. However, the fuel introduction process may be performed under conditions other than coasting of the vehicle as long as it is possible to maintain the rotation of crankshaft 14 without combustion in the internal combustion engine 10.

Some hybrid vehicles having a motor as a drive source in addition to an internal combustion engine are capable of rotating the crankshaft with the driving force of the motor while the combustion operation of the internal combustion engine is stopped. In such hybrid vehicles, the fuel introduction process may be performed while rotating the crankshaft with the driving force of the motor.

The fuel introduction process is performed through the fuel injection into intake passage 15 by the fuel injection valve 18 in the above-described embodiment. However, the fuel introduction process may be performed through fuel injection into the cylinder 12. That is, present disclosure may be employed in an internal combustion engine having a fuel injection valve of a direction injection type, which injects fuel into the cylinder 12.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine, wherein the internal combustion engine includes
    a fuel injection valve,
    a cylinder into which air-fuel mixture containing fuel injected by the fuel injection valve is introduced,
    an ignition plug that ignites the air-fuel mixture introduced into the cylinder by spark discharge,
    an exhaust passage through which gas discharged from inside the cylinder flows, and
    a three-way catalyst provided in the exhaust passage, the controller is configured to execute:
    a fuel introduction process of introducing, in a state in which a crankshaft of the internal combustion engine is rotating, the air-fuel mixture that contains the fuel injected by the fuel injection valve into the exhaust passage without burning the air-fuel mixture in the cylinder; and
    a discharge process of performing spark discharge of the ignition plug at non-combustion ignition timing after the fuel is injected by the fuel injection valve during the execution of the fuel introduction process, wherein
    the non-combustion ignition timing is timing within a period in which the air-fuel mixture is not burned in the cylinder even if the spark discharge of the ignition plug is performed.

2. The controller for an internal combustion engine according to claim 1, wherein the non-combustion ignition timing is within a period in which an in-cylinder pressure of the cylinder is lower than a minimum pressure required to ignite the air-fuel mixture.

3. The controller for an internal combustion engine according to claim 1, wherein the execution of the fuel introduction process and the execution of the discharge process of performing spark discharge are started at same timing.

4. A controller for an internal combustion engine, wherein the internal combustion engine includes
    a fuel injection valve,
    a cylinder into which air-fuel mixture containing fuel injected by the fuel injection valve is introduced,
    an ignition plug that ignites the air-fuel mixture introduced into the cylinder by spark discharge,
    an exhaust passage through which gas discharged from inside the cylinder flows, and a three-way catalyst provided in the exhaust passage, the controller includes circuitry that is configured to execute:

a fuel introduction process of introducing, in a state in which a crankshaft of the internal combustion engine is rotating, the air-fuel mixture that contains the fuel injected by the fuel injection valve into the exhaust passage without burning the air-fuel mixture in the cylinder; and a discharge process of performing spark discharge of the ignition plug at non-combustion ignition timing after the fuel is injected by the fuel injection valve during the execution of the fuel introduction process, wherein the non-combustion ignition timing is timing within a period in which the air-fuel mixture is not burned in the cylinder even if the spark discharge of the ignition plug is performed.

5. The controller for an internal combustion engine according to claim 4, wherein the non-combustion ignition timing is within a period in which an in-cylinder pressure of the cylinder is lower than a minimum pressure required to ignite the air-fuel mixture.

6. The controller for an internal combustion engine according to claim 4, wherein the execution of the fuel introduction process and the execution of the discharge process of performing spark discharge are started at same timing.

7. A control method for an internal combustion engine, wherein the internal combustion engine includes
a fuel injection valve,
a cylinder into which air-fuel mixture containing fuel injected by the fuel injection valve is introduced,
an ignition plug that ignites the air-fuel mixture introduced into the cylinder by spark discharge,
an exhaust passage through which gas discharged from inside the cylinder flows, and
a three-way catalyst provided in the exhaust passage, the method comprises:

executing a fuel introduction process of introducing, in a state in which a crankshaft of the internal combustion engine is rotating, the air-fuel mixture that contains the fuel injected by the fuel injection valve into the exhaust passage without burning the air-fuel mixture in the cylinder; and executing a discharge process of performing spark discharge of the ignition plug at non-combustion ignition timing after the fuel is injected by the fuel injection valve during the execution of the fuel introduction process, wherein the non-combustion ignition timing is timing within a period in which the air-fuel mixture is not burned in the cylinder even if the spark discharge of the ignition plug is performed.

8. The control method for an internal combustion engine according to claim 7, wherein the non-combustion ignition timing is within a period in which an in-cylinder pressure of the cylinder is lower than a minimum pressure required to ignite the air-fuel mixture.

9. The control method for an internal combustion engine according to claim 7, wherein the execution of the fuel introduction process and the execution of the discharge process of performing spark discharge are started at same timing.

* * * * *